(12) United States Patent
Helaine et al.

(10) Patent No.: US 7,676,222 B1
(45) Date of Patent: Mar. 9, 2010

(54) HOME AND ROAMING PROVISIONING METHOD FOR MOBILE TERMINALS

(75) Inventors: Hubert Helaine, Puteaux (FR); Sébastien Bury, Paris (FR)

(73) Assignee: ALCATEL, Paris (FR)

( * ) Notice: Subject to any disclaimer, the term of this patent is extended or adjusted under 35 U.S.C. 154(b) by 835 days.

(21) Appl. No.: 09/716,273

(22) Filed: Nov. 21, 2000

(30) Foreign Application Priority Data

Nov. 22, 1999 (FR) .................................. 99 14637

(51) Int. Cl.
*H04M 3/00* (2006.01)
(52) U.S. Cl. ...................... 455/418; 455/433; 455/458; 340/426.1; 713/169
(58) Field of Classification Search ................. 455/433, 455/432.1, 432.2, 432.3, 419, 420, 551, 414.1, 455/414.2, 414.3, 418, 435, 558, 120, 435.1, 455/411, 406, 410; 709/217, 218, 219; 370/351, 370/352, 353, 354; 340/426.1, 426.2, 426.13, 340/426.18, 428–430; 713/155, 165, 168
See application file for complete search history.

(56) References Cited

U.S. PATENT DOCUMENTS

| | | | |
|---|---|---|---|
| 5,371,794 A | | 12/1994 | Diffie et al. |
| 6,029,065 A | * | 2/2000 | Shah ........................ 455/414.4 |
| 6,031,836 A | * | 2/2000 | Haserodt ..................... 370/389 |
| 6,064,880 A | * | 5/2000 | Alanara ....................... 455/419 |
| 6,131,040 A | * | 10/2000 | Knuutila et al. .......... 455/550.1 |
| 6,195,546 B1 | * | 2/2001 | Leung et al. ................. 455/419 |
| 6,195,705 B1 | * | 2/2001 | Leung ......................... 709/245 |
| 6,226,523 B1 | * | 5/2001 | Karlsson et al. ............. 455/466 |
| 6,405,030 B1 | * | 6/2002 | Suprunov ..................... 455/410 |
| 6,408,175 B1 | * | 6/2002 | Park ............................. 455/411 |
| 6,463,284 B2 | * | 10/2002 | Nakamura et al. ........... 455/433 |
| 6,480,725 B2 | * | 11/2002 | Cassidy et al. ............... 455/558 |
| 6,493,549 B1 | * | 12/2002 | Axelson et al. ............. 455/419 |
| 6,505,047 B1 | * | 1/2003 | Palkisto .................... 455/456.1 |
| 6,549,771 B2 | * | 4/2003 | Chang et al. ................ 455/419 |
| 6,564,056 B1 | * | 5/2003 | Fitzgerald ................ 455/435.1 |
| 6,571,221 B1 | * | 5/2003 | Stewart et al. ................. 705/52 |

(Continued)

FOREIGN PATENT DOCUMENTS

EP      0 889 660 A2      1/1999

(Continued)

OTHER PUBLICATIONS

"Digital Cellular Telecommunications System (Phase 2+); Mobile Station Executed Environment (MexE); Service Description; Stage 1 (GSM 02.57 version 7.1.0 Release 1998, ETSI TS 101 741 v7.1.0)" European Telecommunications Standard, Aug. 1999, pp. 1-21, XP002145174.

*Primary Examiner*—George Eng
*Assistant Examiner*—Khawar Iqbal
(74) *Attorney, Agent, or Firm*—Sughrue Mion, PLLC

(57) ABSTRACT

A telecommunication terminal for accessing a data network via an access network using a set of provisioning data stores a current set of provisioning data and at least one set of protected provisioning data. The protected provisioning data cannot be updated without the intervention of the terminal user. This enables a mobile terminal to change access network without losing the provisioning data of the home access network. It avoids the need for further provisioning on returning to the home access network.

30 Claims, 1 Drawing Sheet

U.S. PATENT DOCUMENTS

| | | | |
|---|---|---|---|
| 6,587,867 B1 * | 7/2003 | Miller et al. | 709/200 |
| 6,603,970 B1 * | 8/2003 | Huelamo Platas et al. | 455/433 |
| 6,647,260 B2 * | 11/2003 | Dusse et al. | 455/419 |
| 6,671,522 B1 * | 12/2003 | Beaudou | 455/558 |
| 6,690,947 B1 * | 2/2004 | Tom | 455/556.1 |
| 6,778,828 B1 * | 8/2004 | Chander et al. | 455/435.1 |
| 6,792,082 B1 * | 9/2004 | Levine | 379/67.1 |
| 6,859,650 B1 * | 2/2005 | Ritter | 455/406 |
| 2002/0086671 A1 * | 7/2002 | Amin et al. | 455/432 |

FOREIGN PATENT DOCUMENTS

| | | |
|---|---|---|
| EP | 0 944 203 A2 | 9/1999 |
| EP | 0 951 191 A1 | 10/1999 |
| WO | WO 99/07173 | 2/1999 |

\* cited by examiner

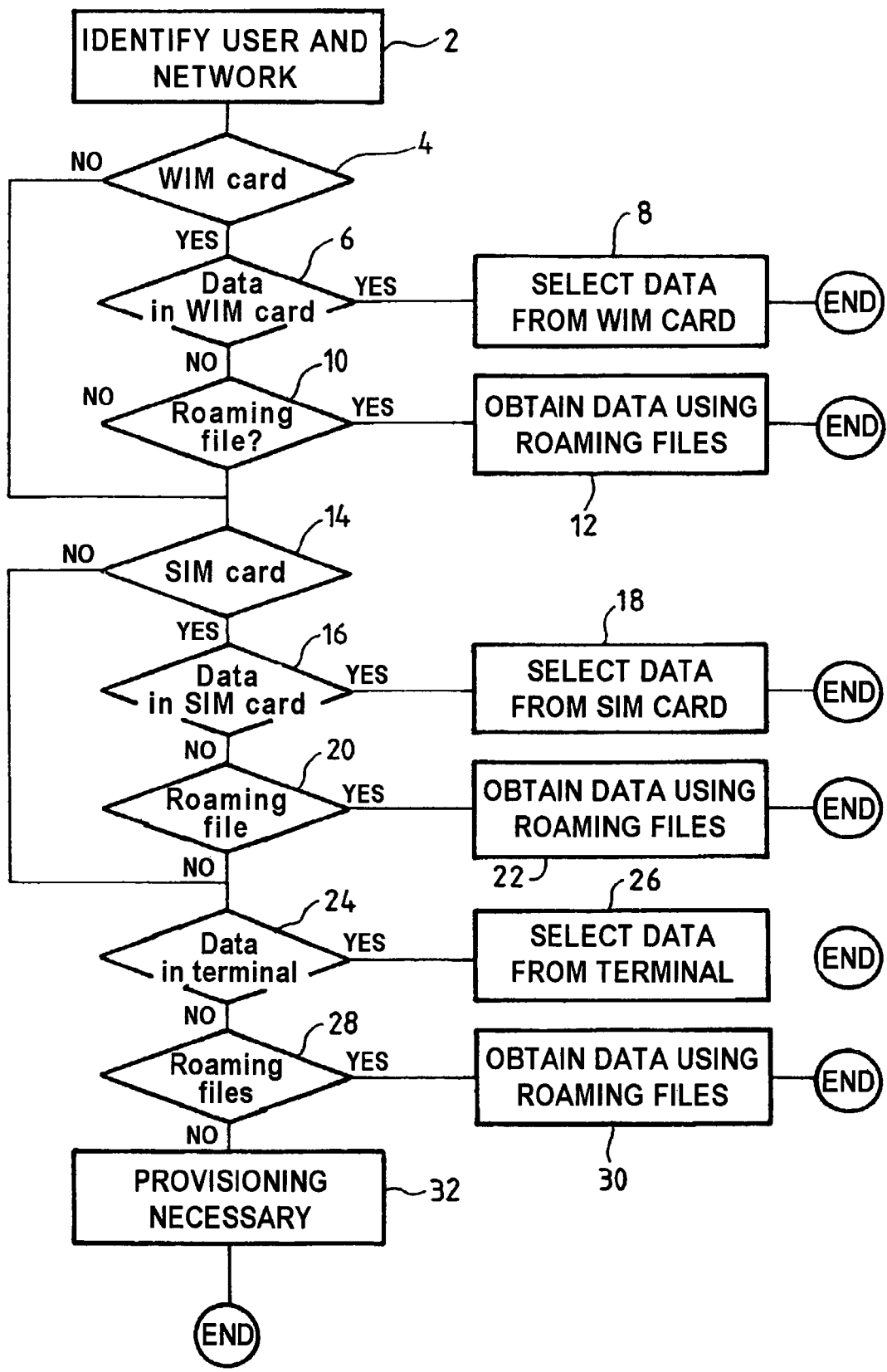

HOME AND ROAMING PROVISIONING METHOD FOR MOBILE TERMINALS

BACKGROUND OF THE INVENTION

1. Field of the Invention

The present invention relates to setting up connections to a data network for terminals, in particular mobile terminals, and more particularly to the provision of data needed to set up a connection.

2. Description of the Prior Art

It is well known in the art that setting up connections across a packet-switched data network such as the Internet involves allocating an address to the data network. For most uses address allocation is dynamic and effected by a service provider to which the user subscribes. The expression "primary provision" or "primary data provision" refers to the step of supplying a user with data for establishing a first connection to a service provider. That data includes all the parameters of all the layers needed for the connection to the service provider, for example the telephone number, the transmission medium employed, a user login name, a password, etc. In the case of a connection to a service provider using a computer, the primary provision is often effected by supplying the user with a CD-ROM containing the provisioning data, with a temporary address. It is also known in the art to provide the primary provisioning data by mail; the data is then copied by the user when prompted to do so, using appropriate software.

Mobile terminals are now appearing which have an Internet connection terminal function in addition to a telephone network terminal function. For terminals of this kind the telephone network provides the access network to the data network. Solutions to the problem of primary provisioning for such terminals have been proposed. Patent applications filed on the same day as the present application, whose titles in translation are "Method of validating data in a terminal" and "Method of validating the primary provisioning of a terminal" provide advantageous solutions for provisioning mobile terminals. The provisioning data is then stored in a physical location or in a logical file of the terminal and is updated if necessary during the next provisioning.

It is also known in the art to enable mobile terminals to use different public land mobile networks (PLMN). A mobile terminal or a user terminal is usually associated with a given public land mobile network or home access network, which is the access network to which they subscribe. The facility to connect to other public networks can also be provided. The term "rooming" refers to a change of network on moving from one access network to another.

A new problem encountered with mobile terminals which can connect to a data network is that of provisioning in the case of a change of access network. If the access network is changed, it is necessary to update the provisioning data in the terminal in order to be able to continue to access the services of the data network. On returning to the home access network, further provisioning is then required to reload the provisioning data for the home network.

This problem encountered on "roaming" between access networks also applies to "roaming" between users, i.e. if the same terminal is used by more than one user, for example with different subscriber identification module (SIM) cards. The expression "plastic roaming" is used to refer to a change of user by changing SIM card.

The invention provides a solution to the above new problems. It enables a change of user or access network without losing the provisioning data. Returning to the home access network or another change of user is possible without it being necessary to carry out further provisioning.

SUMMARY OF THE INVENTION

To be more precise, the invention proposes a telecommunication terminal for accessing a data network via an access network using a set of provisioning data, the terminal having means for storing a current set of provisioning data and means for storing at least one set of protected provisioning data that cannot be updated without the intervention of the terminal user.

The invention also proposes a method of updating provisioning data in a telecommunications terminal for accessing a data network via an access network and an access provider, the method including the steps of:

backing up provisioning data for an access network, an access provider or a user; and protecting the backed up provisioning data to prevent it being updated without the intervention of the user, an access network operator or the access provider.

BRIEF DESCRIPTION OF THE DRAWINGS

Other features and advantages of the invention will become apparent on reading the following description of embodiments of the invention, which description is given by way of example and with reference to the single FIGURE, which is a flowchart of a method in accordance with the invention.

DETAILED DESCRIPTION OF THE PREFERRED EMBODIMENTS

To avoid updating the provisioning data if the access network or user is changed, the invention proposes to provide a terminal with protected provisioning data storage means. The provisioning data is not updated automatically if the user changes, the access network changes or the provisioning is updated, but only if the user intervenes. The invention therefore enables the provisioning data to be used again on returning to the home access network, or if the user changes, without further provisioning. The current provisioning data is then either a copy of the protected data or the protected data itself.

As indicated above, in prior art terminals the provisioning data is stored in a logical file or in a physical location in the terminal and is updated on the occasion of each new provisioning. Such updating can occur if the access network is changed and the user of the terminal carries out a provisioning in the new network; it can also occur if the user is changed and the new user carries out a new provisioning. It can also be a question of a provisioning for a new access to the Internet via a new service provider.

The invention proposes to enable not only storing the current provisioning data in a terminal but also storing protected positioning data in the terminal, which data is updated only on the intervention of the user.

In a first embodiment the protected provisioning data is provisioning data corresponding to a particular access network referred to as the home access network. The home access network is the usual access network of the user of the terminal. If the access network is changed temporarily, the user loads new provisioning data, which is stored in the file for storing the current provisioning data. The user can then access data services using the current provisioning data. On returning to the home access network, the provisioning data contained in the protected provisioning data storage means can be copied into the means for storing the current provisioning data; it is then possible to access the data network without having to carry out further provisioning.

In a second embodiment the protected provisioning data is provisioning data corresponding to a given user of a particular access network. It is then possible, for the same access network, to change the access network user without having to carry out further provisioning.

In these first two embodiments the provisioning data can be stored in a medium dedicated to the access network or to the user in the access network. That medium is typically an SIM card in the case of a GSM telephone access network. The home access network is the home PLMN and the user is identified by their international mobile subscriber identity (IMSI).

In a third embodiment the protected provisioning data is data corresponding to more than one possible access to the data network. This is typically the case with a plurality of data network access providers. The user can then store protected provisioning data corresponding to a usual access to the data network. The user can then carry out provisioning for another access to the data network, for example via another access provider; the user can revert to the old access provider by copying the provisioning data contained in the protected provisioning data storage means.

In a fourth embodiment the protected provisioning data is provisioning data corresponding to a given user for a particular access provider. It is then possible, for the same access provider, to change the user identity without having to carry out further provisioning.

In the third and fourth embodiments the provisioning data can be stored in a medium dedicated to the access provider or service provider, and typically in a wireless application protocol (WAP) identification module (WIM).

Fifth and sixth embodiments of the invention propose to store protected provisioning data for a plurality of content providers or for a plurality of users at the content providers.

In all embodiments there can be provision for storing a plurality of sets of provisioning data corresponding to a plurality of access networks, to a plurality of access network users, to a plurality of data network accesses or access providers, to a plurality of users identified by a data network access provider, to a plurality of content providers, or to a plurality of users for a content provider. It is then advantageous to store for each set of provisioning data indications of the access network, the access network user, the access provider, the access provider user, the content provider or the corresponding user.

From the hardware point of view, the protected provisioning data storage means can be in the terminal itself, in a medium dedicated to the access or content provider, or in a medium dedicated to the access network or the access network user. The number of sets of provisioning data on each medium depends on the size of the medium.

The flowchart in the FIGURE shows one embodiment of a method in accordance with the invention in the case where the mobile terminal automatically selects an appropriate set of provisioning data. In the FIGURE, protected provisioning data storage means are provided:

in a medium dedicated to an access provider—in the example a WIM card;
in a medium dedicated to a type of access network and to a user—in the example an SIM card; and
in the mobile terminal itself.

In each case identification data is stored for each set of protected provisioning data. The provisioning data used is managed by the mobile terminal in accordance with data stored in the WIM card or in the SIM card or in the terminal.

The steps of the flowchart shown in the FIGURE can be executed when the terminal is turned on, when an SIM card is inserted or when a WIM card is inserted. When it is turned on, and in a manner that is known in the art, the terminal identifies a user and a usable telephone network (this is step 2 in the FIGURE). The next step is step 4.

In step 4, the terminal determines if a WIM card is present. If so, the next step is step 6; if not, the next step is step 14.

In step 6, the terminal determines if the WIM card contains protected provisioning data for the user of the WIM card and the current access network. If so, the next step is step 8; if not, the next step is step 10.

In step 8, the provisioning data obtained is selected to enable access to the data network. The process terminates.

In the above steps, the selection of the user of the WIM card is implicit, in that the WIM card is dedicated to one user. It is nevertheless possible to verify the identity of the terminal user by prompting the user to enter at the terminal a personal identification number before enabling the user to use the provisioning data contained in the WIM card.

In step 10, the terminal determines if the WIM card contains files providing for a change of access network (roaming files). If so, the terminal verifies if those files contain provisioning data or if necessary requests provisioning data from the network. The provisioning data can then be stored in the WIM card roaming file and used as indicated in step 12, and the process terminates. If not, the next step is step 32.

The FIGURE does not show the facility for prompting the user to store the provisioning data obtained in step 12 in the protected storage means; the data can be stored in the terminal and/or in the WIM card.

In step 14, it is known that there is no WIM card in the terminal. It is then determined if there is an SIM card in the terminal. If so, the next step is step 16; if not, the next step is step 24.

In step 16, the terminal determines if the SIM card contains protected provisioning data corresponding to the user and to the telephone network that has been identified. If so, the next step is step 18; if not, the next step is step 20.

In step 18, the provisioning data obtained in the SIM card is selected to enable access to the data network. The process terminates.

In the above steps, the selection of the user of the SIM card is implicit in that the SIM card is dedicated to a user. As in the case of the WIM card, it is possible to verify the identity of the terminal user by prompting the user to enter at the terminal a personal identification number before enabling the user to use the provisioning data contained in the SIM card.

In step 20, the terminal determines if the SIM card, if it does not contain usable provisioning data, contains roaming files providing for a change of access network. If so, the terminal determines if the roaming file contains provisioning data or if necessary requests the corresponding provisioning data, stores it in the SIM card roaming file, and uses the corresponding data as indicated in step 22, and the process terminates. If not, the next step is step 24.

As for step 12, the FIGURE does not show the facility to prompt the user to store the provisioning data obtained in step 22 in the protective storage means of the SIM card.

In step 24, it is known that there is no provisioning data stored in the WIM card or in the SIM card or available from roaming files. It is determined whether the terminal itself contains protected provisioning data corresponding to the user or the telephone network that has been identified. If so, the next step is step 26; if not, the next step is step 28.

In step 26, the provisioning data obtained in the terminal is selected to enable access to the data network. The process terminates.

In step 28, it is determined if the terminal, if it does not contain usable provisioning data, contains roaming files providing for a change of access network. If so, the terminal requests the corresponding provisioning data, stores it in its roaming file, and uses the corresponding data, as indicated in step 30, and the process terminates. If not, the next step is step 32.

As for steps 12 and 22, the FIGURE does not show the facility for prompting the user to store the provisioning data obtained in step 30 in the protected storage means of the terminal.

In step 32, it is known that there is no provisioning data either stored or available by means of the roaming files. The process terminates, and provisioning is required.

The process shown in the FIGURE corresponds to an order of decreasing priority for provisioning data stored in the WIM card, in the SIM card or in the terminal. There is no facility for a change of user.

The data stored in the protected provisioning data storage means is preferably erased only on the intervention of the user, either by deleting the corresponding data or by means of an update, as indicated above with reference to steps 12, 22 and 26.

Of course, the invention is not limited to the preferred embodiments described above. It applies to access network types other than the GSM network. In particular, the priority order stated for the example shown in the FIGURE can be changed, as can the place where provisioning data is stored or the type of identification proposed for the provisioning data.

More generally, the invention applies to all types of access network, for example a fixed telephone network, the GSM network or other access network formats. The terminal can therefore be not only a mobile terminal but also a fixed terminal in the case of an access network consisting of a fixed telephone network or another type of terminal for another type of network.

The only data network referred to in the examples is the Internet. The invention can be applied to other types of packet-switched network, for example a WAP network or an X.25 network such as the Transpac network, using a packet assembling/disassembling (PAD) protocol.

In the examples, the protected data cannot be updated or deleted without the intervention of the terminal user. It is also possible to enable modification or deletion of data only by an operator or by the service or content provider; conjoint intervention of the access network operator, the access or content provider and/or the user is also possible.

In all the examples the protected data storage means are "in" the terminal. This means that the protected data is stored either in the terminal itself or in a medium which is integrated with the terminal in normal use, for example an SIM card or a WIM card.

The invention claimed is:

1. A telecommunication terminal for accessing a data network via an access network using a set of provisioning data, the terminal comprising:
    means for storing a current set of primary provisioning data that is updated automatically without intervention of the terminal user;
    means for storing at least one set of protected primary provisioning data that cannot be updated without the intervention of the terminal user; and
    means for selecting a set of provisioning data from a group of the current set of primary provisioning data and the set of protected primary provisioning data,
    wherein a connection to the data network is set up using the selected set of provisioning data, and
    wherein the protected primary provisioning data is information establishing a connection to the data network in a home access network.

2. The terminal claimed in claim 1, wherein the terminal is a mobile terminal.

3. The terminal claimed in claim 1, wherein said data network is a packet-switched data network.

4. The terminal claimed in claim 1, wherein the protected provisioning data storage means are adapted to store a plurality of sets of primary provisioning data for a plurality of accesses to the data network.

5. The terminal according claim 1, further comprising identification data storage means for each provisioning set stored in the protected provisioning data storage means.

6. The terminal claimed in claim 1, wherein the protected provisioning data storage means are in a medium dedicated to an access network or to an operator.

7. The terminal claimed in claim 1, wherein the protected provisioning data storage means are in a medium dedicated to an access or content provider.

8. The terminal claimed in claim 1, wherein the means for storing a current set of provisioning data and the means for storing at least one set of protected provisioning data, each store data for setting up a connection to the data network via a respective access networks for the same terminal and wherein connections to different access networks are established with different stored sets of provisioning data.

9. The terminal claimed in claim 1, wherein, when the selecting means selects the current set of primary provisioning data, the terminal is roaming in a visiting access network and the selected current set of the primary provisioning data is roaming information that establishes a connection to that data network via the visiting access network.

10. A telecommunication terminal for accessing a data network via an access network using a set of provisioning data, the terminal comprising:
    means for storing a current set of provisioning data that is updated automatically without intervention of a user;
    means for storing at least one set of protected provisioning data that cannot be updated without the intervention of an access network operator, and
    means for selecting a set of provisioning data from a group of the current set of primary provisioning data and the set of protected primary provisioning data,
    wherein a connection to the data network is established using the selected set of provisioning data, and
    wherein the protected primary provisioning data is information establishing a connection to the data network in a home access network and the current set of provisioning data comprises roaming information establishing a connection to the data network in a visiting access network.

11. The terminal claimed in claim 10, wherein the terminal is a mobile terminal.

12. The terminal claimed in claim 10, wherein said data network is a packet-switched data network.

13. The terminal claimed in claim 10, wherein the protected provisioning data storage means are adapted to store a plurality of sets of provisioning data for a plurality of accesses to the data network.

14. The terminal claimed in claim 10, further comprising identification data storage means for each provisioning set stored in the protected provisioning data storage means.

15. The terminal claimed in claim 10, wherein the protected provisioning data storage means are in a medium dedicated to an access network or to an operator.

16. The terminal claimed in claim 10, wherein the protected provisioning data storage means are in a medium dedicated to an access or content provider.

17. A telecommunication terminal for accessing a data network via an access network using a set of provisioning data, the terminal comprising:
   means for storing a current set of provisioning data to access the data network that is updated automatically without intervention of a user;
   means for storing at least one set of protected provisioning data that cannot be updated without the intervention of an access provider; and
   means for selecting a set of provisioning data from a group of the current set of primary provisioning data and the set of protected primary provisioning data,
   wherein a connection to the data network is established using the selected set of provisioning data, and
   wherein the protected primary provisioning data is information establishing a connection to the data network in a home access network.

18. The terminal claimed in claim 17, wherein the terminal is a mobile terminal.

19. The terminal claimed in claim 17, wherein said data network is a packet switched data network.

20. The terminal claimed in claim 17, wherein the protected provisioning data storage means are adapted to store a plurality of sets of provisioning data for a plurality of accesses to the data network.

21. The terminal claimed in claim 17, further comprising identification data storage means for each provisioning set stored in the protected provisioning data storage means.

22. The terminal claimed in claim 17, wherein the protected provisioning data storage means are in a medium dedicated to an access network or to an operator.

23. The terminal claimed in claim 17, wherein the protected provisioning data storage means are in a medium dedicated to an access or content provider.

24. A method of accessing a data network by a telecommunications terminal, the method comprising:
   identifying a user and a network using the terminal;
   when the user and the network are identified, checking a storage of the terminal for a protected provisioning data that cannot be modified without user intervention;
   when said protected provisioning data is detected, using said provisioning data to connect the terminal to the data network; and
   when said protected provisioning data is not detected, requesting current provisioning data;
   wherein said storage is in one of:
   the terminal;
   a medium dedicated to an access provider; and
   a medium dedicated to an access network,
   wherein before storing in said storage said protected provisioning data, the user is queried whether said protected provisioning data is to be stored.

25. The method claimed in claim 24, wherein the provisioning data is primary provisioning data to access the data network.

26. The terminal claimed in claim 1, wherein both the means for storing a current set of provisioning data and the means for storing at least one set of protected provisioning data are located in at least one of storage of the terminal and on a card insertable into the terminal.

27. The method claimed in claim 24, wherein, when the current provisioning data is requested, the terminal downloads the current provisioning data from a service provider and the terminal establishes a connection with the data network using the current provisioning data.

28. The method claimed in claim 27, wherein, prior to said requesting of the current provisioning data from the service provider, the terminal checks whether the protected provisioning data is for establishing the connection with the data network.

29. A telecommunication terminal for accessing a data network via an access network using a set of provisioning data, the terminal comprising:
   means for storing a current set of primary provisioning data that is updated automatically without intervention of a user;
   means for storing at least one set of protected primary provisioning data that cannot be updated without intervention from a terminal user; and
   means for copying one of said at least one set of protected primary provisioning data from the protected storing means into the current storing means,
   wherein the protected primary provisioning data is information establishing a connection to the data network in a home access network.

30. The terminal claimed in claim 29, wherein, when the terminal returns to a home access network, said one of said at least one set of protected primary provisioning data is copied from the protected storing means into the current storing means and wherein, the current set of primary provisioning data is downloaded from an access network provider in a visiting network.

* * * * *